US011153382B2

(12) United States Patent
Cilfone et al.

(10) Patent No.: US 11,153,382 B2
(45) Date of Patent: Oct. 19, 2021

(54) ISOLATION OF MANAGEMENT DATA FOR SECURITY AND OPERATIONAL ADVANTAGES

(71) Applicant: International Business Machines Corporation, Armonk, NY (US)

(72) Inventors: Bart R. Cilfone, Marina del Rey, CA (US); Alan M. Frazier, Palatine, IL (US); Patrick A. Tamborski, Chicago, IL (US); Sanjaya Kumar, South Elgin, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 442 days.

(21) Appl. No.: 16/024,276

(22) Filed: Jun. 29, 2018

(65) Prior Publication Data

US 2020/0007622 A1    Jan. 2, 2020

(51) Int. Cl.
*H04L 29/08* (2006.01)
*H04L 12/24* (2006.01)

(52) U.S. Cl.
CPC ........ *H04L 67/1097* (2013.01); *H04L 41/042* (2013.01); *H04L 41/069* (2013.01); *H04L 67/1095* (2013.01)

(58) Field of Classification Search
CPC . H04L 41/042; H04L 41/069; H04L 67/1095; H04L 67/1097
USPC ......................................... 709/213; 714/6.22
See application file for complete search history.

(56) References Cited

U.S. PATENT DOCUMENTS

| 6,253,240 B1* | 6/2001 | Axberg ..................... G06F 8/34 709/223 |
| 6,356,282 B2 | 5/2002 | Roytman et al. |
| 6,603,396 B2 | 8/2003 | Lewis et al. |
| 7,219,208 B2* | 5/2007 | Nagashima ......... H04L 67/1097 709/223 |
| 7,529,954 B2* | 5/2009 | Harada ................. G06F 3/0607 709/220 |
| 7,620,710 B2* | 11/2009 | Kottomtharayil ....... G06F 16/10 709/223 |

(Continued)

OTHER PUBLICATIONS

Cottrell et al.; Distributed Computing Environment Monitoring and User Expectations; Computing in High Energy Physics' 95, CHEP '95; 1996; pp. 537-543.

*Primary Examiner* — Michael Won
(74) *Attorney, Agent, or Firm* — Anthony England; Andrew D. Wright; Roberts Calderon Safran & Cole, P.C.

(57) ABSTRACT

A multi-system dispersed storage network (DSN) comprises a first DSN system that includes a first plurality of storage units, a first plurality of dispersed storage (DS) processing units and a first set of management units and a second DSN system that includes a second plurality of storage units, a second plurality of DS processing units and a second set of management units. The first set of management units manages a first set of configuration data of the first DSN system. A first management unit of the second set of management units, when, in a first mode, manages at least a first configuration data of the first set of configuration data, in a second mode, manages at least a first configuration data of the second set of configuration data, and in a third mode, manages at least the first configuration data of the first and second sets of configuration data.

16 Claims, 10 Drawing Sheets

(56) References Cited

U.S. PATENT DOCUMENTS

| | | | | |
|---|---|---|---|---|
| 8,078,718 B1* | 12/2011 | Nulkar | ............... | G06F 11/2294 |
| | | | | 709/224 |
| 8,468,244 B2* | 6/2013 | Redlich | ............... | G06Q 10/107 |
| | | | | 709/225 |
| 8,707,004 B2* | 4/2014 | Hara | ................... | G06F 3/0605 |
| | | | | 711/170 |
| 9,213,621 B2 | 12/2015 | Atkins et al. | | |
| 9,256,482 B2 | 2/2016 | Boger et al. | | |
| 9,348,499 B2 | 5/2016 | Aymeloglu et al. | | |
| 2003/0023722 A1 | 1/2003 | Vinberg | | |
| 2003/0145114 A1* | 7/2003 | Gertner | ................. | G06F 3/067 |
| | | | | 709/246 |
| 2005/0102297 A1* | 5/2005 | Lloyd | ................ | H04L 61/1552 |
| 2005/0131998 A1* | 6/2005 | Takashima | ....... | G11B 20/00731 |
| | | | | 709/203 |
| 2005/0192932 A1* | 9/2005 | Kazar | ................. | G06F 16/10 |
| 2006/0248306 A1* | 11/2006 | Suishu | ................ | G06F 3/067 |
| | | | | 711/170 |
| 2009/0228579 A1* | 9/2009 | Sanghvi | ............... | H04L 41/145 |
| | | | | 709/224 |
| 2010/0031074 A1* | 2/2010 | Takahashi | ............ | G06F 3/0631 |
| | | | | 713/324 |
| 2011/0055903 A1* | 3/2011 | Leggette | ............... | H04L 63/20 |
| | | | | 726/4 |
| 2011/0225362 A1* | 9/2011 | Leggette | ............... | H04L 63/10 |
| | | | | 711/114 |
| 2011/0311051 A1* | 12/2011 | Resch | ................. | H04L 9/3271 |
| | | | | 380/270 |
| 2012/0144021 A1 | 6/2012 | Carey et al. | | |
| 2012/0198537 A1* | 8/2012 | Grube | ................. | G06F 3/0604 |
| | | | | 726/9 |
| 2012/0226772 A1* | 9/2012 | Grube | ................. | G06F 3/067 |
| | | | | 709/217 |
| 2012/0324293 A1* | 12/2012 | Grube | ................. | H04L 41/0853 |
| | | | | 714/41 |
| 2014/0019579 A1* | 1/2014 | Motwani | ............. | G06F 3/0614 |
| | | | | 709/216 |
| 2014/0222753 A1* | 8/2014 | Gladwin | ............. | G06Q 50/01 |
| | | | | 707/609 |
| 2014/0325264 A1* | 10/2014 | Gladwin | ............ | G06F 11/2094 |
| | | | | 714/6.22 |
| 2014/0337666 A1* | 11/2014 | Resch | ................. | G06F 11/1092 |
| | | | | 714/6.22 |
| 2014/0380121 A1* | 12/2014 | Grube | ................. | H04L 67/1097 |
| | | | | 714/763 |
| 2015/0189572 A1* | 7/2015 | McHenry | ............. | H04W 8/245 |
| | | | | 726/1 |
| 2015/0220400 A1* | 8/2015 | Resch | ................. | G06F 11/1076 |
| | | | | 714/6.2 |
| 2015/0381730 A1* | 12/2015 | Resch | ................. | G06F 3/0623 |
| | | | | 709/225 |
| 2020/0210358 A1* | 7/2020 | ChoFleming | ....... | H04L 67/2833 |

* cited by examiner

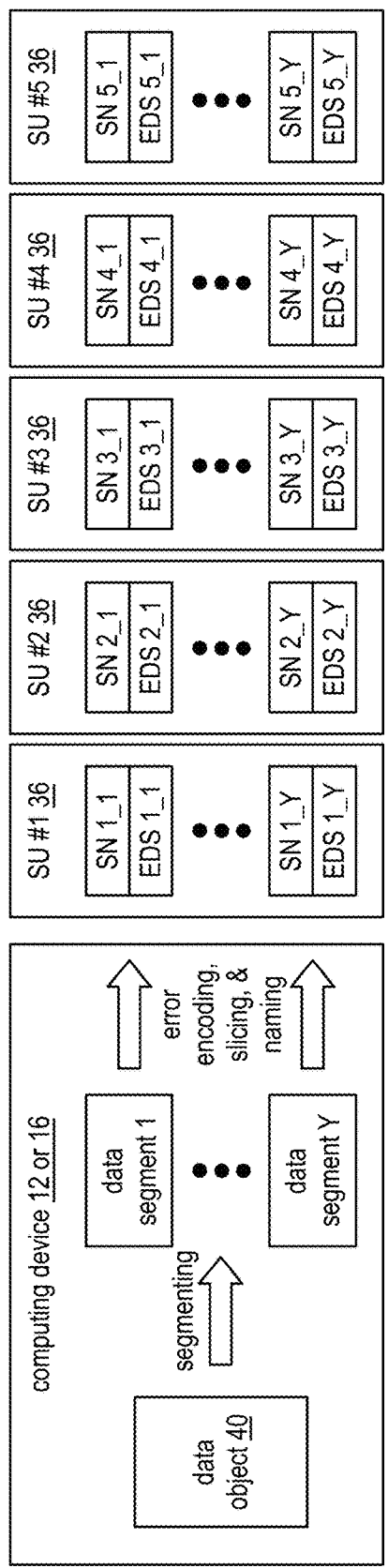
FIG. 3
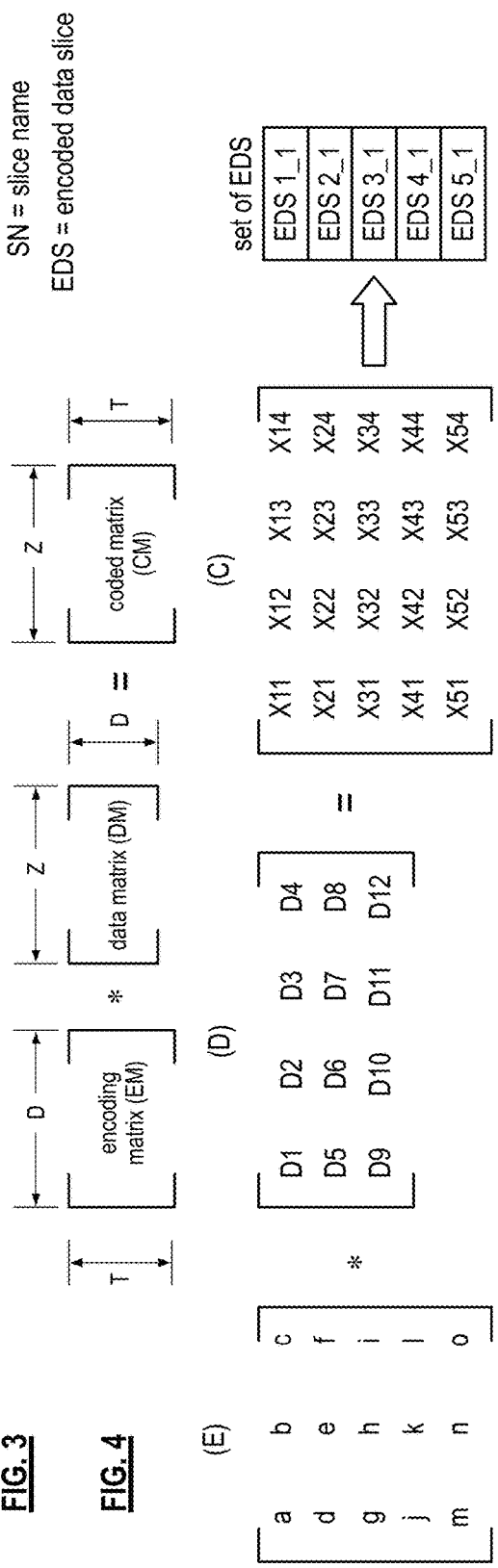
FIG. 4
FIG. 5
FIG. 6

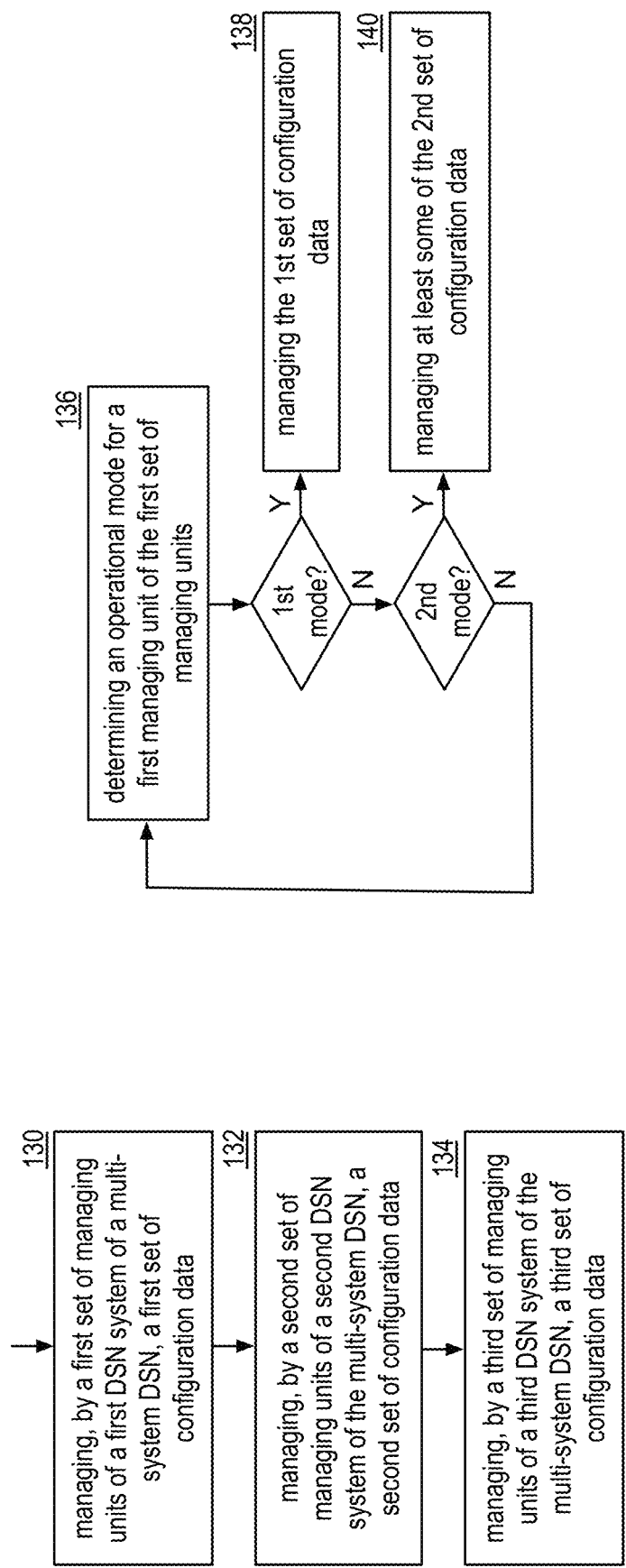

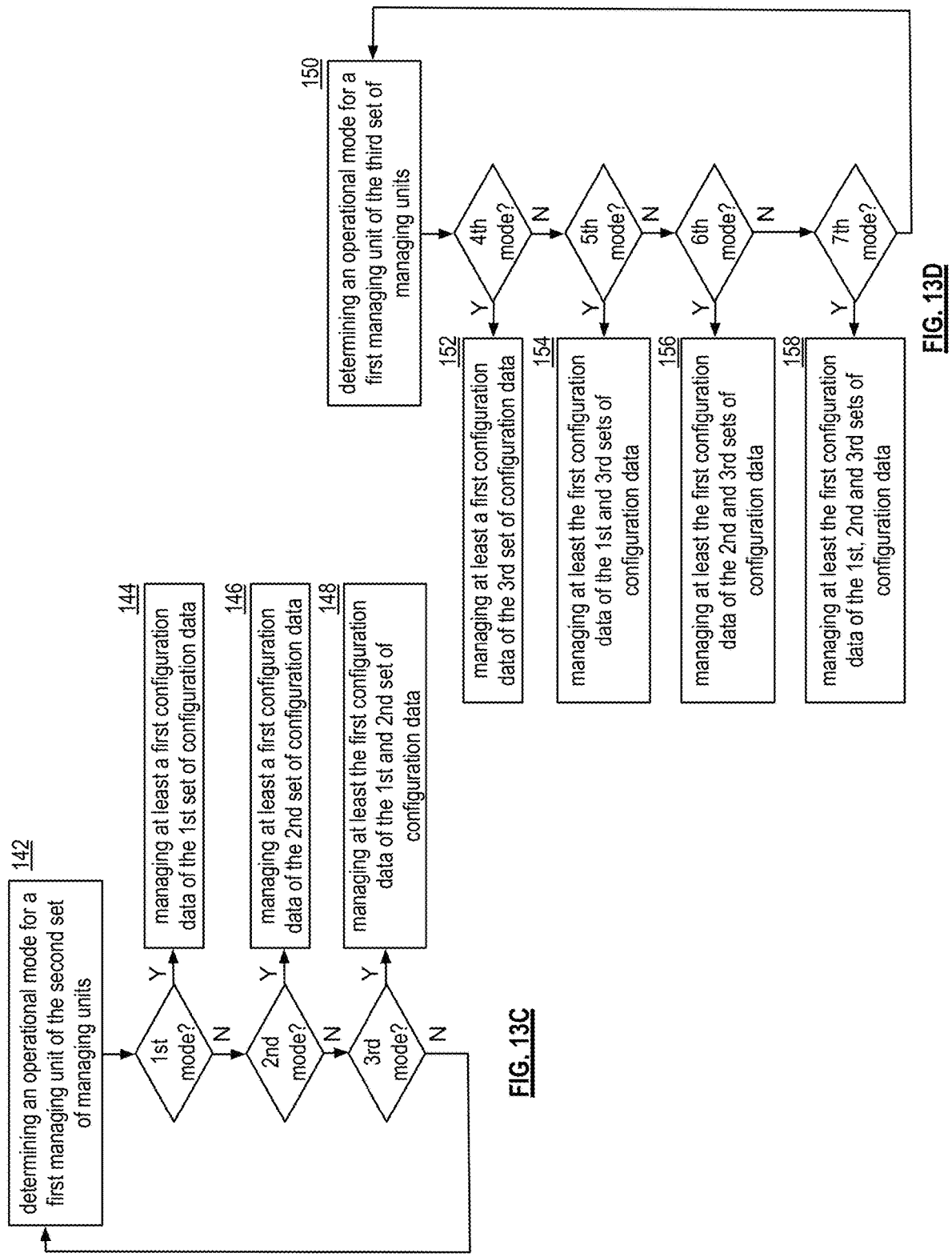

ISOLATION OF MANAGEMENT DATA FOR SECURITY AND OPERATIONAL ADVANTAGES

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

As is further know, a managing node may locally store system configuration information regarding a set of devices of a first system. Under this configuration, when adding a second set of devices to a second system under the managing node, there may be difficulty in generating and syncing accurate reports (e.g., conflicting data IDs, conflicting user access permissions, etc.).

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 13A is a flowchart diagram of an embodiment of a method of managing configuration data in accordance with the present invention;

FIG. 13B is a flowchart diagram of an example of a method of managing configuration data in accordance with the present invention;

FIG. 13C is a flowchart diagram of another example of a method of managing configuration data in accordance with the present invention; and FIG. 13D is a flowchart diagram of another example of a method of managing configuration data in accordance with the present invention.

DETAILED DESCRIPTION OF THE INVENTION

Figure 1:
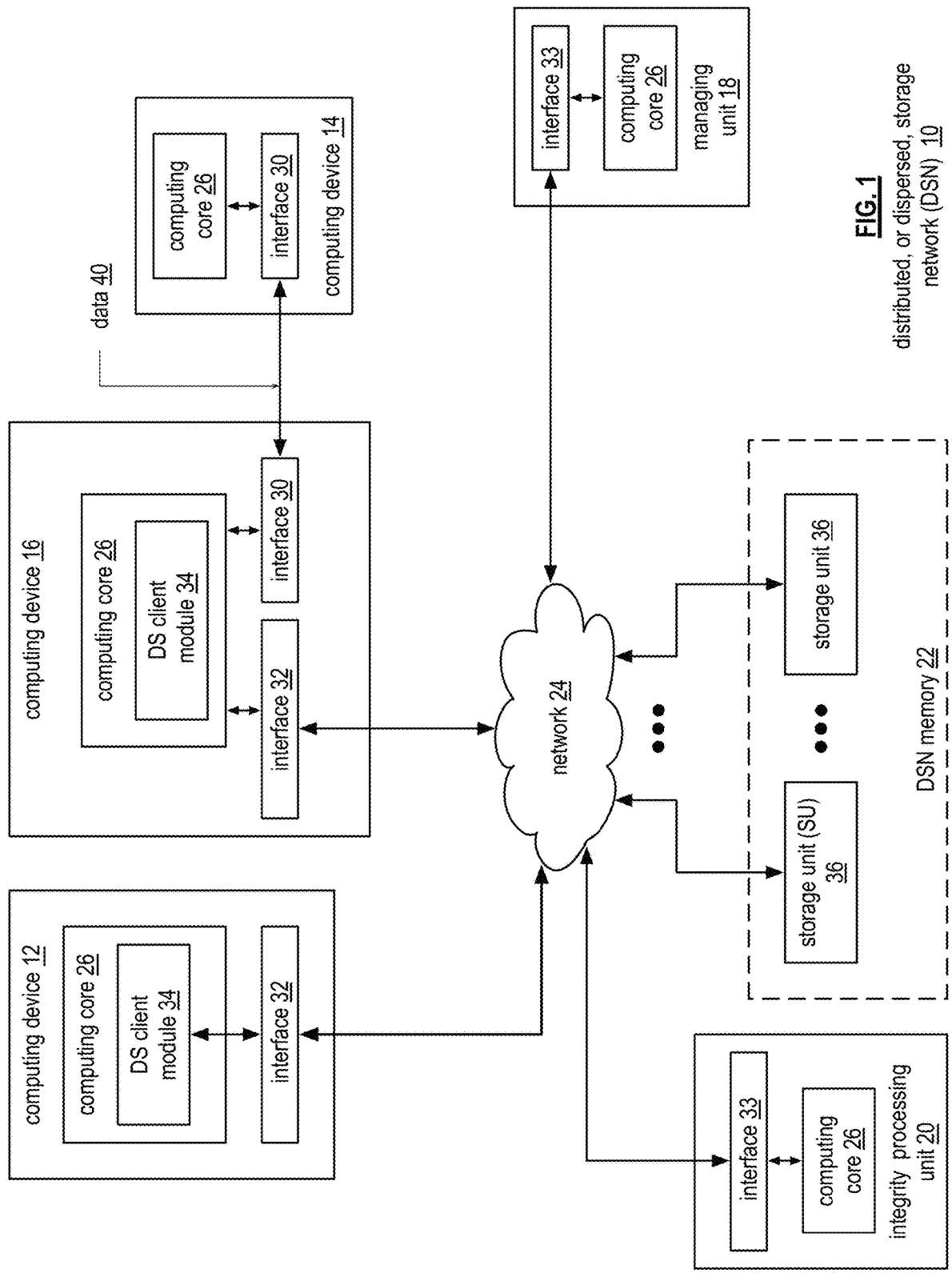
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
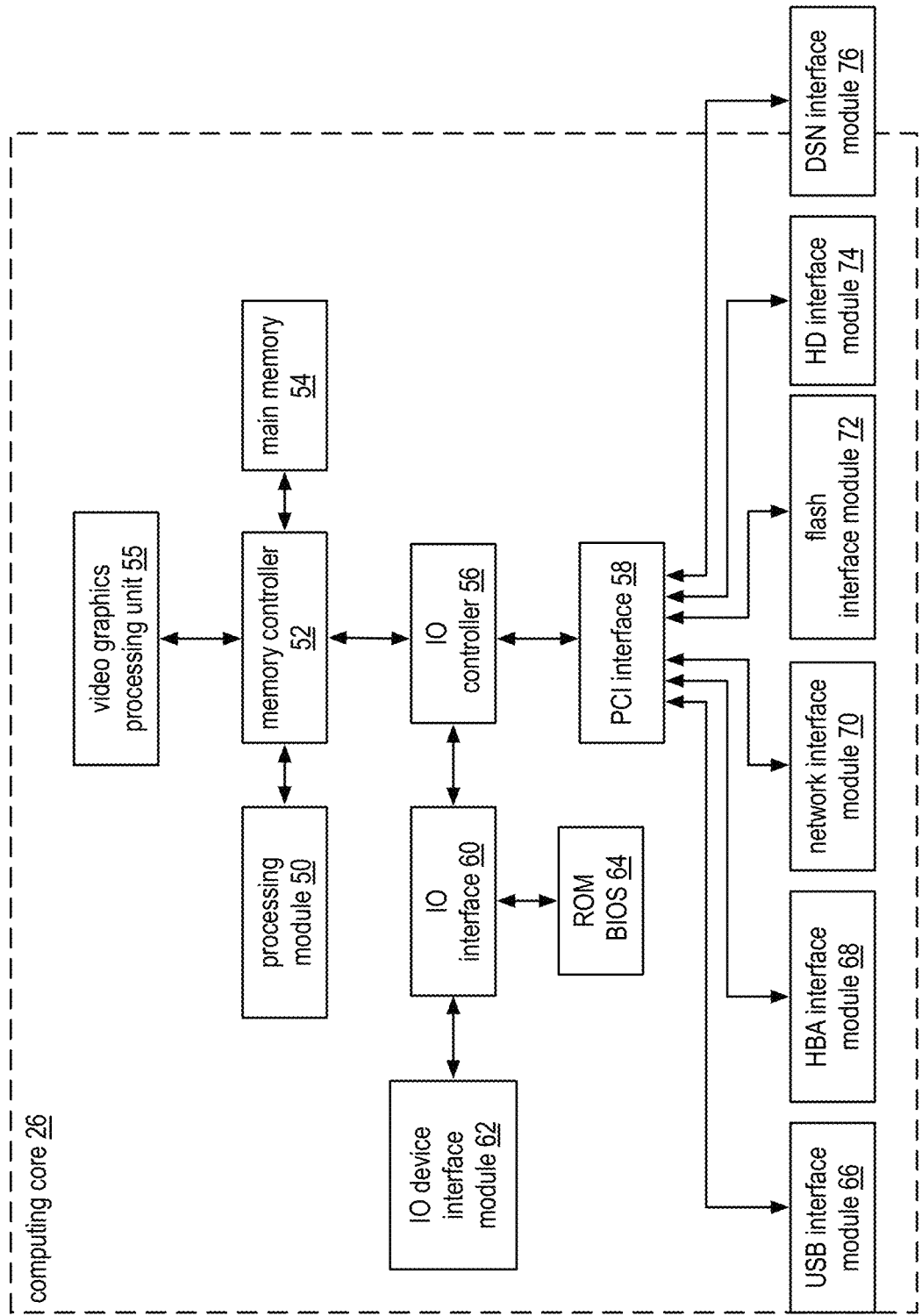
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data 40 as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity check-sum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
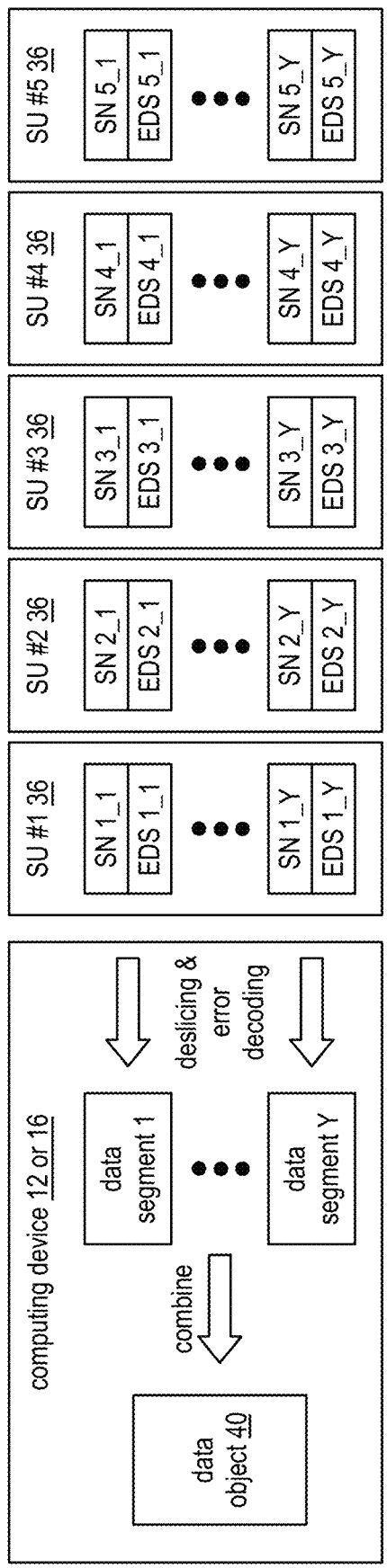
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
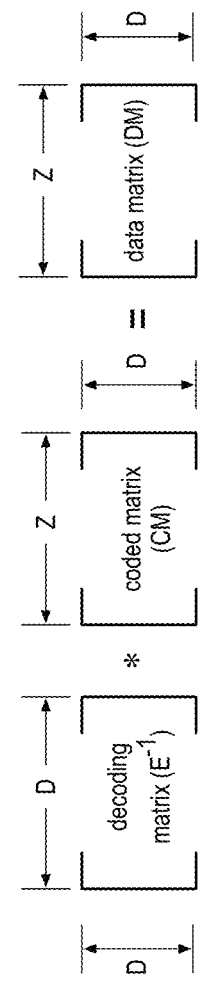
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
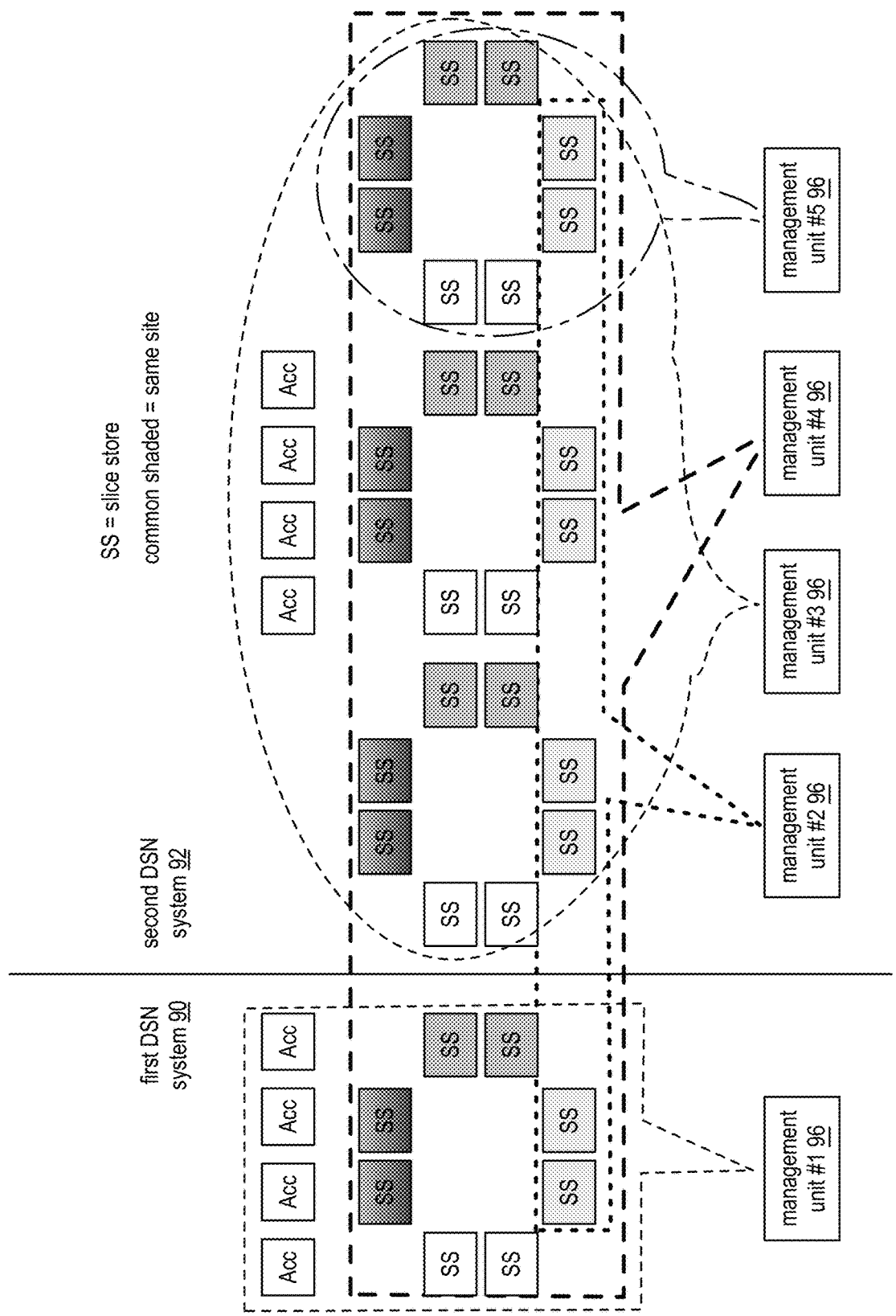
FIG. 9 is a schematic block diagram of an embodiment of a multi-system dispersed storage network (DSN) in accordance with the present invention.

FIG. 9 a schematic block diagram of a multiple distributed storage network (DSN) that includes a first DSN system 90 and a second DSN system 92. In one example, the first DSN system is a legacy system and the second DSN system is a newly added system. Each DSN system includes accessors (ACCs) and a plurality of slice stores (SS). The slices stores may be implemented using a storage unit 36 of FIG. 1. The accessors may be implemented using one or more of a computing device 12-16 of FIG. 1. The multi-DSN also includes five management units #1-5 96 (which may be implemented by a managing unit 18 of FIG. 1), although another multi-DSN system may have more or less than five management units 96.

The various shaded slice stores (e.g., no shade, light shade, medium shade and dark shade) each represent slice stores at a common site. For example, all light shaded SSs may be located at the same physical location. As another example, all dark shaded SSs may be located within a threshold latency of one another. Note that each of the SSs may have network communication paths to all other SSs. In one example however, a first storage pool of a second DSN system only communicates with a second, or third storage pool of the second DSN system when reallocation is in progress. In another example, an SS from a first storage pool of a second DSN system only communicates with another SS from a first storage pool of a first DSN system when mirroring is enabled or when a vault migration is in progress.

The multi-DSN allows varying access to each managing unit 95. For example, a first management unit #1 96 for use by a user manager who works in a department which bought a storage system, may have access to one DSN system (e.g., the first DSN system 90). A second management unit #2 96 for use by a user manager who is a cloud storage administrator across a corporation, may have access to two DSN systems (e.g., the first and second DSN systems 90-92). A third management unit #3 96 for use by a user manager who is the head of a company network operations center in Dallas, may have access to one site within two DSN systems (e.g., the light grey shaded SS). A fourth management unit #4 96 for use by a user manager who works at an acquired company within a parent corporation, may have access to one DSN system (e.g., the second DSN system 92). A fifth management unit #5 96 for use by a contractor who is tasked with investigating the integration of a new model of slice stores (SS) into a huge existing storage system, may have access to a portion (e.g., a storage pool) of one DSN system (e.g., the second DSN system 92).

Figure 10:
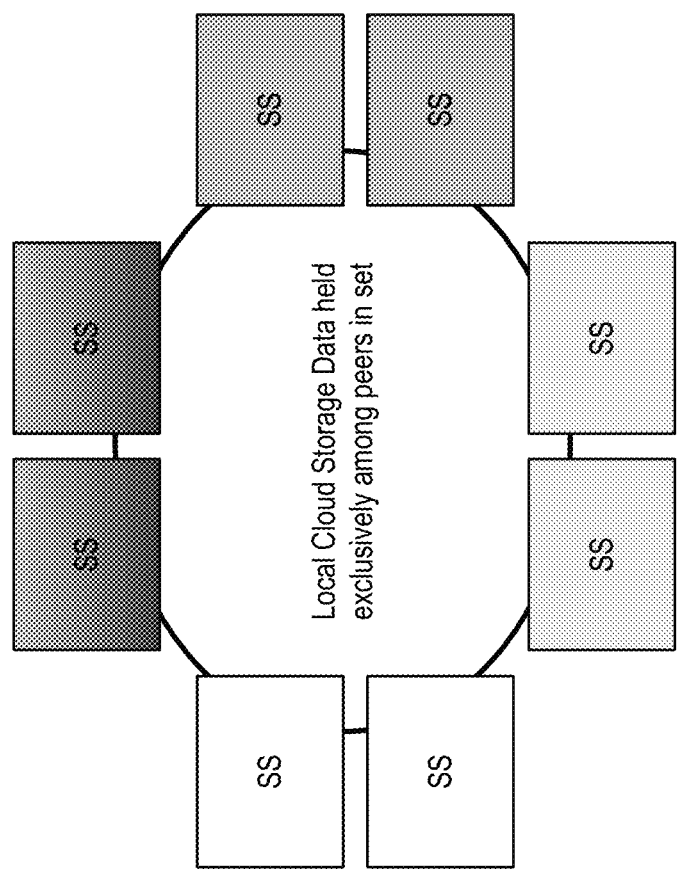
FIG. 10 is a schematic block diagram of an embodiment of a set of storage units in accordance with the present invention.

FIG. 10 a schematic block diagram of a set of storage units (e.g., a storage pool) of a multi-DSN system. In this example, all storage units (e.g., slice stores (SS)) in a single set utilize a common "local cloud storage" area to store their management related data. At a first time, the local cloud storage may be a management vault. At a second time, the local cloud storage may be a specialized distributed data structure (e.g., information shared via command and control channels). In an embodiment, when customer support needs management data from an on premises system, the data may be replicated from the local storage container to a public cloud storage container. Then, reimplementation and unification of a data transfer protocol as well as a dump log transfer mechanism would allow seamless integration into the public could.

In an embodiment, each storage unit (e.g., SS) of the set of storage units, in a local cloud configuration, may collect its current statistics at particular time intervals (e.g., every 5 seconds, every minute, etc.) and write the collected results to the local cloud storage. Each storage unit may also perform historical roll up of localized statistical values and write to local cloud storage, make alerting decisions regarding localized error states based on rules definitions (e.g. one-node problems) and repair local outages (e.g., restart crashed or hung processes). In an embodiment, each SS may also interact efficiently and effectively with other SSs in a storage pool. For example, an SS may build a communication graph using a spanning tree like algorithm. As another example, the SS may monitor peers to identify offline or severely degraded nodes (e.g., no direct alerting) As yet another example, the SS may exchange along graph info about health and statistics, bridging subgraphs and may build a complete picture of health and statistic state of all peers. As a further example, the SS may answer queries regarding health and statistic state of any peer (e.g., other SSs in storage pool). As yet another further example, the SS may regenerate a communication graph in face of communication errors. As yet still another further example, each SS may determine a local master within a set of SSs to act on its behalf outside of this set of storage units (or SSs).

When an SS acts as a local master of the local cloud storage, it may be authorized to send alerts (e.g., via email) to an administrator (e.g., via an outbound email server), may capture consensus driven values to local cloud storage (e.g., health information, utilization information, etc.), may perform historical roll up of consensus drive values and write to local cloud storage, may make alerting decisions regarding local cluster error states based on rule definitions (e.g., set problems) and may interact with other storage pools' local master SS.

Each set of storage units may store and roll up statistics and monitoring regarding its peers and alerting about health issues. The set may also collect and aggregate health and statistic information in a form visible from any peer in the set and provide a local master to use for communication with other sets. The set local master will aid in determining a pool-level master to act on behalf of all devices in the pool. When acting as a pool level master, a slice store may be authorized to send email alerts to an administrator via an outbound email server and determine if other sets are experiencing full scale outages.

Figure 11:
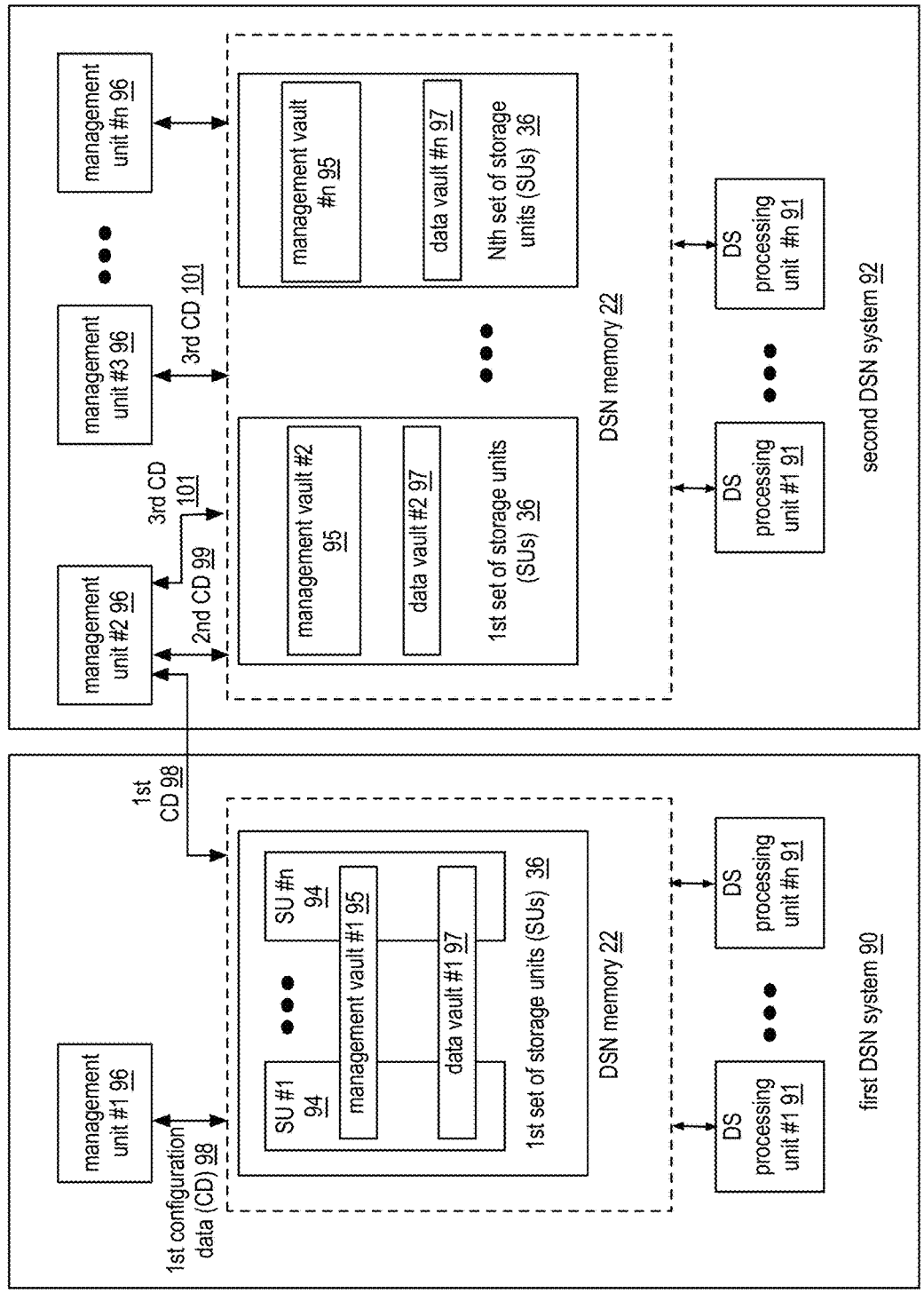
FIG. 11 is a schematic block diagram of another embodiment of a multi-system dispersed storage network (DSN) in accordance with the present invention.
Figure 12:
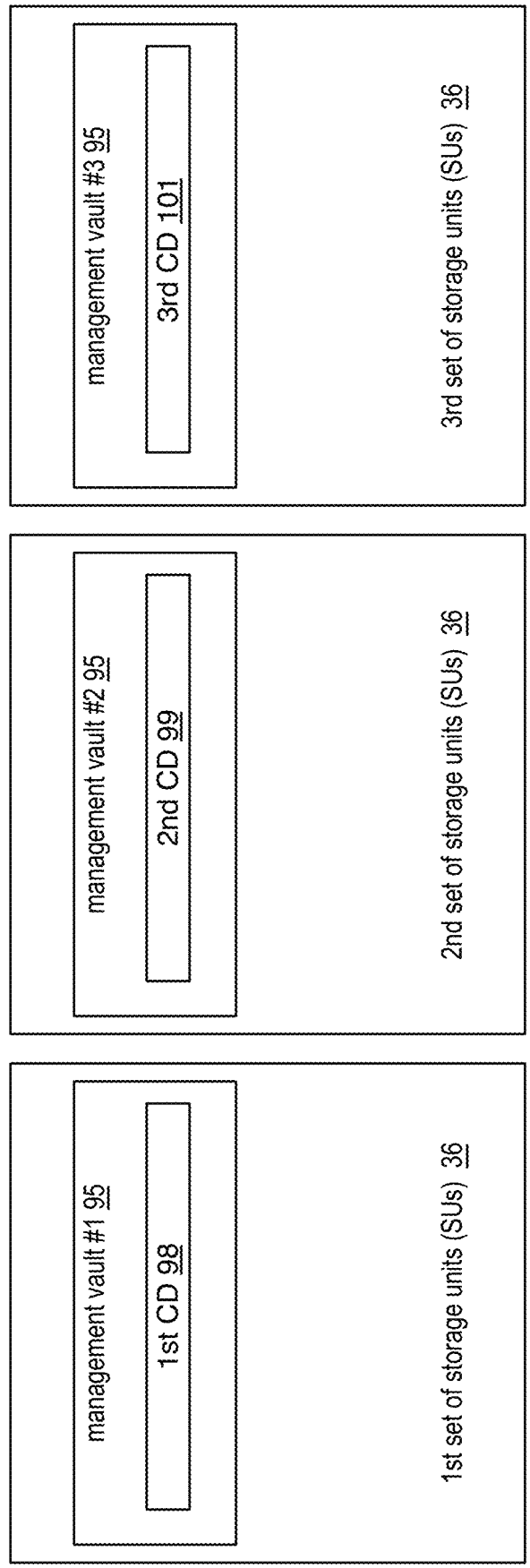
FIG. 12 is a schematic block diagram of an embodiment of storing configuration data in accordance with the present invention.

FIG. 11 is a schematic block diagram of a multiple distributed storage network (multi-DSN) system that includes a plurality of DSN systems. A first DSN system 90 of the multi-DSN system includes a first plurality of storage units (e.g., the $1^{st}$ set of SUs 36), a first plurality of dispersed storage (DS) processing units 91 and a first set of management units (e.g., managing unit #1 96). A second DSN system 92 of the multi-DSN system includes a second plurality of storage units (e.g., a first set of storage units 36 through an Nth set of storage units 36), a second plurality of dispersed storage (DS) processing units 91 and a second set of management units (e.g., managing units #2-#n 96). Note that the multi-DSN system may include more than 2 DSN systems.

Each DSN system may also include a plurality of storage zones (e.g., a storage pool, a set of storage units, a plurality of storage units, a plurality of sets of storage units, etc.). In an example, a first storage zone of the plurality of storage zones is the first set of storage units 36 of the first DSN system 90, a second storage zone of the plurality of storage zones is the first set of storage units 36 of the second DSN system 92 and a third storage zone of the plurality of storage zones is the second thru Nth set of storage units 36 of the second DSN system 92.

System configuration data for each storage zone may live in a storage container that is resident to the storage zone or may be stored in a management vault of the storage zone. In an example, a portion of the system configuration data (e.g., $1^{st}$ configuration data (CD) 98, $2^{nd}$ CD 99, and $3^{rd}$ CD 101) may be stored in separate management vaults. For example, the $1^{st}$ CD 98 may be stored in a first management vault #1

95 of the first DSN system, the $2^{nd}$ CD 99 may be stored in a second management vault #2 95 of the second DSN system, and the $3^{rd}$ CD 101 may be stored in third management vault #3 95 of the second DSN system. The system configuration data of the multi-DSN system may include one or more of dispersed storage error encoding parameters, an addressing convention (e.g., a disturbed agreement protocol, etc.), an access control (e.g., no access, read/write access, etc.), and management data (e.g., health information, usage information, statistics, events, etc.). In one example, the access control may also allow a management unit to have access to various vault levels of the multi-DSN system. For example, a first management unit #1 96 may have read/write only access to a first vault level (e.g., first management vault #1 95, vault #1 97), read only access to a second vault level (e.g., management vault #2 95 of the second DSN system 92), and no access to a third vault level (e.g., vault #2 97 of the second DSN system 92).

When system configuration is stored in a management vault or storage container, rather than store all known configurations in a single container, different logical sections of the system configuration can be stored in separate isolated containers with independent security constraints (e.g., credentials, access privileges, etc.). For example, a first portion of the first CD 99 is stored in a first container with a first security constraint, a second portion of the first CD 99 is stored in a second container with a second security constraint and a third portion of the first CD 99 is stored in a third container with a third security constraint. Note in one example, the first, second, and third security constraints may include at least some common security constraints.

Note a first set of configuration data of the system configuration data comprises one or more of configuration data regarding a set of DS processing units of the first DSN system, configuration data regarding a vault of the first DSN system, and configuration data regarding one or more sets of storage units of the first DSN system. Further note, configuration data of the first set of configuration data may be unique for at least one of a DS processing unit of the first DSN system, a vault of the first DSN system, and a storage unit of the first DSN system.

In one example, system configuration data may reside in European boundaries for a DSN system in Europe, while allowing the system configuration data to be viewed and modified by a management application (e.g., on a managing unit) which resides within United States boundaries. Depending on the policy needs of the solution, the authorization to perform cross-region system configuration management may be permanent or may be temporary. Note a first set of configuration data of the system configuration data comprises one or more of configuration data regarding a set of DS processing units of the first DSN system, configuration data regarding a vault of the first DSN system, and configuration data regarding one or more sets of storage units of the first DSN system.

The multi-DSN system allows for a storage system (e.g., a first DSN system 90 and a second DSN system 92), which may have been initially constructed as two independent storage systems, to be viewed under a single management application view. Further, the multi-DSN system allows for the ability to apply changes globally across multiple regions (e.g., storage zones, DSN systems, etc.) and run administrative queries and reports across multiple regions simultaneously. Therefore, system administration solutions are more flexible.

A management unit 96 may be utilized to connect to one or more management vaults or storage containers to read and/or write system configuration. For example, a management unit #2 96 may have read/write access to the first CD 98 stored in management vault #1 95 of the first DSN system 90, may also have read/write access to second CD 99 stored in a management vault #2 95 of the second DSN system 92 and may have read only access to third CD 101 stored in a management vault #3 of the second DSN system 92. As another example, management unit #1 96 may have read/write access to the first CD 98, but may only have read access to CD 99. As yet another example, management unit #n may have read/write access to management vault #n 95 (e.g., which stores $3^{rd}$ CD 101) and to management vault #2 (e.g., which stores $2^{nd}$ CD 99), and may have read only access to management vault #1 95.

A management zone is the boundary by which the system configuration is managed. In one example, the natural system boundary on which a management zone would be defined is the storage pool. In one embodiment, all storage units (SUs) comprising a single storage pool as well as all vaults held on that storage pool would have their relevant configuration information held in a single management vault (e.g., management vault 95) or storage container.

In one example, a separate storage pool would use a separate management vault or storage container. Each of the management vaults 95 may have different security constraints. For example, a first management vault 95 may include first user credentials and/or first internet protocol (IP) address restrictions and a second management vault 95 may include second user credentials and/or second internet protocol (IP) address restrictions. Further, each management vault 95 may be able to restrict access to read-only at the ds unit layer. This allows for an administrator to setup a single management unit, point it to two different management zones (e.g., storage pools), enter the credentials for each of the corresponding management vaults 95, and then access the system configuration for both storage pools simultaneously within a single user interface (UI) and application program interface (API).

Another administrator may only have access to one of these storage pools, in which case they would setup their own management unit with credentials for the one management zone that management unit can access, and neither the other administrator nor the management unit would have any knowledge of the existence of the other management zone. Similarly, for system configuration or security auditing or for customer support purposes, the administrator could provide read-only access to the management zone so that a third party could bring their own management unit online, point it to the management zone, and view the system configuration without any potential ability to modify it.

For environments where multiple cloud object storage systems have been deployed, rather than requiring a separate management unit 96 for each system, a single management unit 96 could be used to connect to each of the individual management zones and effectively merge the global system configuration together in the context of a single user interface (UI) for management purposes, but still keep the systems logically separate for functional and security purposes. These capabilities provide a direct cost benefit, usability benefit, and security benefit.

As an example, a management unit 96 may have access to four management vaults 95 and each of the four management vaults 95 includes three access restrictions (e.g., read, write, read/write). Thus, there may be 81 permutations (e.g., modes) of access for the one management unit 96 in the multi-DSN system.

FIGS. 13A-D are flowchart diagrams of an embodiment of a method of managing configuration data of a multi-system dispersed storage network (DSN). In the example of FIGS. 13A-D, the multi-system DSN includes three DSN systems. FIG. 13A is a flowchart diagram of an example of managing configuration data with the multi-system DSN. The method begins or continues at step 130, where a first set of management units of a first DSN system of the multi-DSN system manages a first set of configuration data. The method continues with step 132, where a second set of management units of a second DSN system of the multi-DSN system manages a second set of configuration data. The method continues with step 134, where a third set of management units of a third DSN system of the multi-DSN system manages a third set of configuration data. Note that for a set of management units, each management unit of the set of management units may be configured to manage, when in a particular mode of operation, a portion of one or more of the first, second and third sets of configuration data. Some examples of the modes of managing configuration data are discussed in further detail with reference to FIGS. 13B-13D. Note the first set of configuration data may be stored in a first container of the first DSN system, the second set of configuration data may be stored in a second management vault of the second DSN system, and the third set of configuration data may be stored in a third management vault of the third DSN system. Further note, the operational mode may be determined by one or more of a computing device 12-16 and a managing unit 18 of FIG. 1 and a management unit 96 of FIG. 11. In one example, the computing device 12-16 is controlled by an administrator.

FIG. 13B is a flowchart diagram of an example of a method of managing configuration data. The method begins with step 136, with determining an operational mode for a first managing unit of the first set of managing units of the first DSN system of the multi-system DSN. When determined to be in a first mode, the method continues to step 138, where the first managing unit manages a first set of configuration data of the first DSN system. When determined to be in a second mode, the method continues to step 140, where the first managing unit manages at least some of a second set of configuration data of the second DSN system.

FIG. 13C is a flowchart diagram of another example of a method of managing configuration data. The method begins with step 142, with determining an operational mode for a first management unit of a second set of management units of the second DSN system of the multi-system DSN. When determined to be in a first mode, the method continues with step 144, where the managing unit manages at least a first configuration data of a first set of configuration data. When determined to be in a second mode, the method continues with step 146, where the managing unit manages at least a first configuration data of a second set of configuration data. When determined to be in a third mode, the method continues with step 148, where the managing unit manages at least the first configuration data of the first and second sets of configuration data.

FIG. 13D is a flowchart diagram of another example of a method of managing configuration data. The method begins with step 150, with determining an operational mode for a first management unit of a third set of management units of the third DSN system of the multi-system DSN. When in a fourth mode, the method continues with step 152, where the first management unit manages at least a first configuration data of the third set of configuration data. When in a fifth mode, the method continues with step 154, where the first management unit manages at least the first configuration data of the first and third sets of configuration data. When in a sixth mode, the method continues with step 156, where the first management unit manages at least the first configuration data of the second and third sets of configuration data. When in a seventh mode, the method continues with step 158, where the first management unit manages at least the first configuration data of the first, second and third sets of configuration data.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A multi-system dispersed storage network (DSN) comprising:
 a first DSN system that includes a first plurality of storage units, a first plurality of dispersed storage (DS) processing units and a first set of management units, wherein the first set of management units manages a first set of configuration data of the first DSN system;
 a second DSN system that includes a second plurality of storage units, a second plurality of dispersed storage (DS) processing units and a second set of management units, wherein the second set of management units manages a second set of configuration data of the second DSN system, and wherein a first management unit of the second set of management units:
   when in a first mode, manages at least a first configuration data of the first set of configuration data;
   when in a second mode, manages at least a first configuration data of the second set of configuration data; and
   when in a third mode, manages at least the first configuration data of the first and second sets of configuration data,
further comprising a third DSN system that includes a third plurality of storage units, a third plurality of dispersed storage (DS) processing units and a third set of management units, wherein the third set of management units manages a third set of configuration data of the third DSN system, wherein a first management unit of the third set of management units is operable to:
   when in a fourth mode, manages at least a first configuration data of the third set of configuration data;
   when in a fifth mode, manages at least the first configuration data of the first and third sets of configuration data;
   when in a sixth mode, manages at least the first configuration data of the second and third sets of configuration data; and
   when in a seventh mode, manages at least the first configuration data of the first, second and third sets of configuration data.

2. The multi-system DSN of claim 1, wherein the first set of management units are further operable to:
   manage at least some of the second set of configuration data.

3. The multi-system DSN of claim 1, wherein the first set of configuration data comprises one or more of:
   configuration data regarding a set of DS processing units of the first DSN system;
   configuration data regarding a vault of the first DSN system; and
   configuration data regarding one or more sets of storage units of the first DSN system.

4. The multi-system DSN of claim 3, wherein the configuration data comprises one or more of:
   dispersed storage error encoding parameters; and
   an addressing convention;
   access controls; and
   management data.

5. The multi-system DSN of claim 1, wherein configuration data of the first set of configuration data is unique for at least one of:
   a DS processing unit of the first DSN system;
   a vault of the first DSN system; and
   a storage unit of the first DSN system.

6. The multi-system DSN of claim 1, wherein storage of a set of configuration data comprises one or more of:
   the first set of configuration data is stored in a first management vault of the first plurality of storage units; and
   the second set of configuration data is stored in a second management vault of the second plurality of storage units.

7. The multi-system DSN of claim 1, wherein storage of a set of configuration data comprises one or more of:
   storing the first set of configuration data within a first container of the first DSN system; and
   storing the second set of configuration data within a second container of the first DSN system.

8. The multi-system DSN of claim 1 further comprises:
the first set of storage units including a management vault that includes access privileges comprising one or more of:
no access;
read only access; and
read/write access.

9. A method comprises:
managing, by a first set of management units of a first dispersed storage network (DSN) system of a multi-system DSN, a first set of configuration data of the first DSN system, wherein the first DSN system includes a first plurality of storage units, a first plurality of dispersed storage (DS) processing units and the first set of management units;
managing, by a second set of management units of a second DSN system of the multi-system DSN, a second set of configuration data of the second DSN system, wherein the second DSN system includes a second plurality of storage units, a second plurality of dispersed storage (DS) processing units and the second set of management units, wherein a first management unit of the second set of management units operates by:
   managing, when in a first mode, at least a first configuration data of the first set of configuration data;
   managing, when in a second mode, at least a first configuration data of the second set of configuration data;
   managing, when in a third mode, at least the first configuration data of the first and second sets of configuration data; and
managing, by a third set of management units of a third DSN system of the multi-system DSN, a third set of configuration data, wherein the third DSN system includes a third plurality of storage units, a third plurality of dispersed storage (DS) processing units and the third set of management units, wherein a first management unit of the third set of management units operates by:
   managing, when in a fourth mode, at least a first configuration data of the third set of configuration data;
   managing, when in a fifth mode, at least the first configuration data of the first and third sets of configuration data;
   managing, when in a sixth mode, at least the first configuration data of the second and third sets of configuration data; and
   managing, when in a seventh mode, at least the first configuration data of the first, second and third sets of configuration data.

10. The method of claim 9 further comprises:
managing, by the first set of management units, at least some of the second set of configuration data.

11. The method of claim 9, wherein the first set of configuration data comprises one or more of:
   configuration data regarding a set of DS processing units of the first DSN system;
   configuration data regarding a vault of the first DSN system; and
   configuration data regarding one or more sets of storage units of the first DSN system.

12. The method of claim 9, wherein the configuration data comprises one or more of:
   dispersed storage error encoding parameters;
   an addressing convention;
   access controls; and
   management data.

13. The method of claim 9, wherein configuration data of the first set of configuration data is unique for at least one of:
 a DS processing unit of the first DSN system;
 a vault of the first DSN system; and
 a storage unit of the first DSN system.

14. The method of claim 9, wherein storage of a respective set of configuration data comprises one or more of:
 storing the first set of configuration data in a first management vault of the first plurality of storage units; and
 storing the second set of configuration data in a second management vault of the second plurality of storage units.

15. The method of claim 9, wherein storage of a set of configuration data comprises one or more of:
 storing the first set of configuration data within a first container of the first DSN system; and
 storing the second set of configuration data within a second container of the first DSN system.

16. The method of claim 9, further comprises:
 the first set of storage units including a management vault that includes access privileges comprising one or more of:
 no access;
 read only access; and
 read/write access.

* * * * *